United States Patent [19]

Rose

[11] 4,415,720

[45] Nov. 15, 1983

[54] PRODUCTION OF AROMATIC POLYSULPHONES

[75] Inventor: John B. Rose, Letchworth, England

[73] Assignee: Imperial Chemical Industries PLC, London, England

[21] Appl. No.: 304,556

[22] Filed: Sep. 22, 1981

[30] Foreign Application Priority Data

| Oct. 1, 1980 | [GB] | United Kingdom | 8031595 |
| Oct. 1, 1980 | [GB] | United Kingdom | 8031596 |
| Jan. 8, 1981 | [GB] | United Kingdom | 8100400 |
| Apr. 29, 1981 | [GB] | United Kingdom | 8113228 |
| Apr. 29, 1981 | [GB] | United Kingdom | 8113229 |
| May 15, 1981 | [GB] | United Kingdom | 8114967 |

[51] Int. Cl.$^3$ .............................................. C08G 75/23
[52] U.S. Cl. ................................... 528/171; 528/125; 528/126; 528/128; 528/174; 528/391
[58] Field of Search ............... 528/171, 174, 391, 125, 528/126, 128

[56] References Cited

U.S. PATENT DOCUMENTS

| 3,418,277 | 12/1968 | Cohen | 260/49 |
| 4,094,867 | 6/1978 | Jones | 528/391 |
| 4,229,564 | 10/1980 | Dahl | 528/125 |

FOREIGN PATENT DOCUMENTS 1166624  10/1969  United Kingdom ................ 528/391

OTHER PUBLICATIONS

Chemical Abstracts, vol. 67, p. 10299, Abstract No. 109055f (1967).

*Primary Examiner*—Lester L. Lee
*Attorney, Agent, or Firm*—Cushman, Darby & Cushman

[57] ABSTRACT

Aromatic polysulphones are prepared by the reaction under substantially anhydrous conditions in the presence of a fluoroalkane sulphonic acid, particularly trifluoromethane sulphonic acid or difluoromethane sulphonic acid, of the reactants selected from the following class:
  (a) an aromatic compound of specified formula (such as diphenyl ether or diphenyl) and a sulphonating agent;
  (b) an aryl monosulphonic acid of specified formula (such as diphenyl ether-4-sulphonic acid or diphenyl-4-sulphonic acid); and
  (c) an aryl disulphonic acid of specified formula (such as diphenyl ether-4,4'-disulphonic acid or diphenyl-4,4'-disulphonic acid) and an aromatic compound as defined in (a).

17 Claims, No Drawings

PRODUCTION OF AROMATIC POLYSULPHONES

The present invention relates to a process for the production of aromatic polysulphones.

Thermoplastic aromatic polysulphones are polymers which are well known to the art. They are of significant commercial utility in view of their excellent mechanical performance at high temperatures, their high strength and toughness and their excellent resistance to fire and chemicals.

Heretofore, two quite distinct synthetic methods have usually been employed for the production of aromatic polysulphones.

The first of these methods involves a polysulphonylation process in which sulphone linkages are formed by the polymerisation reaction between an aryl disulphonyl halide with a compound containing at least two aromatically bound hydrogen atoms or by the self-polymerisation of an aryl monosulphonyl halide containing at least one aromatically bound hydrogen atom. Such a process involves electrophilic aromatic substitution in which the aromatic substrate is attacked by some form of an aryl sulphonylium cation and hydrogen displaced as a proton. The attacking agent is formed by the interaction of the sulphonyl halide with an anhydrous Lewis acid, also known as a Friedel-Crafts catalyst. Examples of this type of process are described in British Pat. Nos. 1 016 245, 1 109 842 and 1 060 546.

The second of these methods involves a nucleophilic polyetherification process where a dialkali metal salt of a dihydric phenol is reacted with an activated dihalobenzenoid compound, or a monoalkali metal salt of an activated halophenol is self-reacted, to provide ether bonds via displacement of halogen by phenoxide anions with the removal of halogen as alkali metal halide. The halogen atoms of the dihalobenzenoid compound or halophenol are activated to nucleophilic attack by a sulphone substituent group situated ortho or para therto, so that an aromatic polyethersulphone polymer is formed. Examples of this type of process are described in British Pat. Nos. 1 078 234 and 1 153 035.

Both the nucleophilic and electrophilic processes described above require the utilisation of monomeric starting materials which can sometimes be difficult or expensive to obtain commercially. Thus the electrophilic process employs a mono- or disulphonyl halide while the nucleophilic process requires the use of dihydric phenol and dihalobenzenoid compound or halophenol.

I have now discovered a very versatile and useful electrophilic process for the production of aromatic polysulphones which does not require the provision of an aryl sulphonyl halide for the polymerisation reaction.

According to the present invention there is provideda process for the production of an aromatic polysulphone which comprises reacting under substantially anhydrous conditions in the presence of a fluoroalkane sulphonic acid the reactants selected from the following class:

(a) at least one aromatic compound of formula

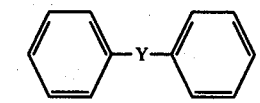

wherein —Y— is a direct link, —O—,

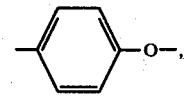

—CF$_2$—, —CR$_1$R$_2$— where R$_1$ and R$_2$ which may be the same or different are fully fluorinated alkyl radicals, or

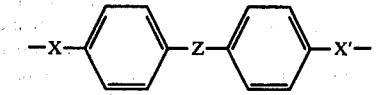

where —X— and —X'— which may be the same or different are each a direct link, —O—, —CF$_2$—, or —CR$_1$R$_2$— where R$_1$ and R$_2$ are as defined above, and —Z— is —CO—, —SO$_2$—, —CF$_2$—, or —CR$_1$R$_2$— where R$_1$ and R$_2$ are as defined above; or a nuclear substituted derivative thereof provided that at least the nuclear hydrogen atoms para to —Y— remain unsubstituted;

and a sulphonating agent;

(b) at least one aryl monosulphonic acid of formula

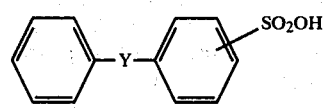

wherein —Y— is as defined in (a); or a nuclear-substituted derivative thereof provided that in the benzene ring linked to —Y— not having the sulphonic acid group at least the nuclear hydrogen atom para to —Y— remains unsubstituted;

(c) at least one aryl disulphonic acid of formula

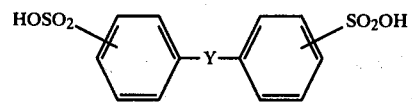

wherein —Y— is as defined in (a); or a nuclear-substituted derivative thereof;

and at least one aromatic compound as defined in (a).

It is to be understood that the aryl monosulphonic and aryl disulphonic acids used in (b) and (c) may if desired be generated by starting from the corresponding alkali metal salts and generating the acids by admixture with the acidic medium.

Thus the process of the invention does not employ an aryl sulphonyl halide (as previously commonly employed when preparing a thermoplastic aromatic polysulphone using an electrophilic process) but, instead, an aromatic compound and a sulphonating agent as defined in (a), or an aryl monosulphonic acid as defined in (b), or an aryl disulphonic acid and an aromatic compound as defined in (c). The ability of an aromatic compound and a sulphonating agent as defined in (a), or an aryl monosulphonic acid as defined in (b), or an aryl disulphonic acid and an aromatic compound as defined in (c) to undergo electrophilic polymerisation in the presence of a fluoroalkane sulphonic acid to a thermoplastic aromatic polysulphone was hitherto unsuspected. Moreover the aromatic substances used in the process of the invention are generally speaking cheaper and more readily available than aryl sulphonyl halides.

The presence of the fluoroalkane sulphonic acid in the process of the invention is a crucial feature, and it is thought that this reagent acts as a Lewis Acid and, at least to a certain extent, as a dehydrating agent. The preferred fluoroalkane sulphonic acids for use according to the invention are trifluoromethane sulphonic acid $CF_3SO_2OH$ and difluoromethane sulphonic acid $CF_2HSO_2OH$. Other fluoroalkane sulphonic acids which may be used are the higher members of a series of fluoroalkane sulphonic acids containing 1 to 18 carbon atoms (which may be fully fluorinated as described in GB 758 467 or partially fluorinated), e.g. the fluoroethane and fluoropropropane sulphonic acids such as $CF_3CF_2SO_2OH$, $CF_2HCF_2SO_2OH$ and $CF_3CF_2CF_2SO_2OH$ and the polymeric fluoroalkane sulphonic acids such as the 'Nafion' products. It is convenient to adjust the amount of fluoroalkane sulphonic acid used so that the acid, if liquid, acts as the reaction solvent. The use of a reaction system which comprises a more catalytic (i.e. much smaller) quantity of the fluoroalkane sulphonic acid is not, however, excluded from the scope of the invention.

By reaction under substantially anhydrous conditions is meant ensuring that free moisture is substantially excluded from the reaction mixture both before and during the reaction. Of course, water is produced as the reaction proceeds but it is thought that this is substantially removed by the fluoroalkane sulphonic acid and (if employed) by an added dehydrating agent.

In the reactant sub-class (a) of the invention, the use of which is preferred to that of sub-classes (b) or (c), a single aromatic compound (as defined) may be used in the preparation of the aromatic polysulphone to produce a polymer consisting solely of units derived from this compound; alternatively two or more such aromatic compounds may be employed to produce a copolymer consisting of units derived from these compounds. It is preferable that substantially equimolar quantities of the at least one aromatic compound and the sulphonating agent be employed.

Generally speaking, to effect the process of the invention using reactant sub-class (a) it is convenient to dissolve the aromatic compound in the fluoroalkane sulphonic acid and then to add the sulphonating agent (possibly dissolved in fluoroalkane sulphonic acid) followed by a period of reaction at the selected reaction temperature(s).

The sulphonating agent which is employed in reactant sub-class (a) of the present invention should be one that has been found by experiment to be effective. I have already found, for example, that sulphuric acid and chlorosulphonic acid are sulphonating agents which will yield an aromatic polysulphone according to the process of the invention.

In the reactant sub-class (b) of the invention, a single aryl monosulphonic acid (as defined) may be used in the preparation of the aromatic polysulphone to produce a polymer consisting solely of units derived from this compound; alternatively two or more such aryl monosulphonic acids may be employed to produce a copolymer consisting of units derived from these compounds.

In the reactant sub-class (c) of the invention a single aryl disulphonic acid (as defined) and a single aromatic compound (as defined) may be used in the preparation of the aromatic polysulphone to produce a polymer consisting solely of units derived from these compounds; alternatively two or more such aryl disulphonic acids and/or two or more such aromatic compounds may be employed to produce a copolymer containing units derived from these compounds. It is preferable to employ substantially equimolar quantities of the at least one aryl disulphonic acid and the at least one aromatic compound. However the proportions may be varied slightly from equimolar quantities in order to modify the molecular weight of the product.

The aromatic substances (as defined) which are used in the process of the present invention are preferably unsubstituted in the aromatic nuclei (i.e. apart from the substituents which are present as indicated in the formulae (i), (ii) and (iii)); nuclear substitution tends to affect the activity of the aromatic substances in the polymerisation reaction. Nevertheless, nuclear-substituted aromatic substances may be employed in the present invention (with the provisions, as defined, concerning hydrogen atoms) providing that the substituent or substituents do not deleteriously affect the polymerisation reaction or the properties of the polymer so produced. Whether or not the position and nature of a nuclear substituent has a deleterious effect may be discovered by experimentation.

It is a surprising feature of the present invention that in most cases the polymerisation reaction can be carried out or controlled to yield a predominantly "all para" product, i.e. a product in which most of the sulphonylated benzene rings of the repeat units are para-sulphonylated with respect to Y because the chain extension by the sulphonylating species has proceeded predominantly through substitution of the hydrogen atom(s) para to the group Y. (The achievement of a wholly or predominantly all para aromatic polysulphone is highly desirable because the mechanical properties of aromatic polysulphones increasingly deteriorate as the proportion of ortho-sulphonylated benzene rings in the polymer becomes greater.)

Thus, e.g., in the case of employing an aromatic compound in reactant sub-class (a) of formula

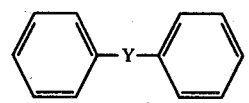

the polymerisation may be controlled in most cases to yield a polymer consisting almost entirely of para-sulphonylated repeat units of formula

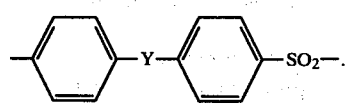

Since groups such as aryl, aralkyl, and aryl ether are usually ortho/para orientating, a polymer containing a significant proportion of ortho-sulphonylated repeat units of formula

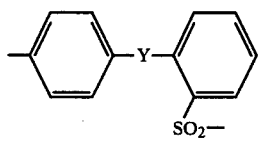

might be expected to be usually produced. However, the proportion of such ortho-sulphonylated repeat units in the polymer produced can be controlled by manipulating the conditions of the polymerisation, so that polymers having predominantly all para-sulphonylated repeat units are formed.

Similarly, in the case of using reactant sub-class (b), when the aromatic monosulphonic acid employed has the formula

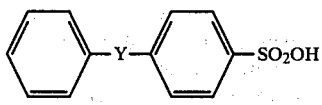

the aromatic polysulphone produced in many cases is likely to consist almost entirely of all para repeat units of formula

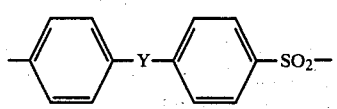

Similarly, when using reactant sub-class (c), when employing an aromatic compound of formula

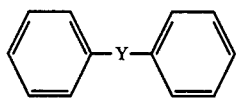

and an aryl disulphonic acid of formula

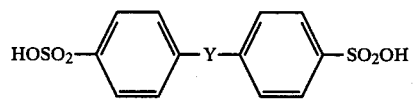

the aromatic polysulphone produced in many cases is likely to consist almost entirely of all para repeat units of formula

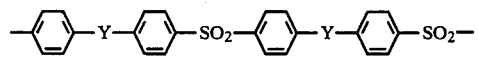

which reduces to

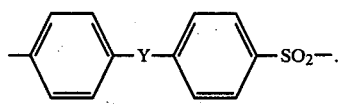

Our experience thus far indicates that control of the proportion ortho-sulphonylation may be achieved, for example, according to the reaction temperature employed; generally speaking, a higher polymerisation temperature favours a lower ortho content and a higher all para content; this is fortuitous in that a higher polymerisation temperature also favours a faster reaction rate.

In some of the Examples of this specification, an estimate of the proportion of ortho-sulphonylation in the aromatic polysulphone produced is provided by the use of nuclear magnetic resonance (nmr) spectroscopy (220 MHz) by virtue of the fact that the nmr signal due to the aromatic hydrogen atoms in the para-sulphonylated benzene rings can be readily distinguished from the signal due to the aromatic hydrogen atoms in the ortho-sulphonylated benzene rings. This proportion is termed the percentage of ortho-sulphonylation and is defined by:

$$\frac{100 \times o}{o + p} \%$$

where $o$ is the number of benzene rings in which Y and $SO_2$ are ortho to each other and $p$ is the number of benzene rings in which Y and $SO_2$ are para to each other.

It is interesting to note that the process of the invention does not appear to be applicable to polymerisations which would involve the sulphonylation of condensed aromatic ring systems or extended polyphenylene systems. Thus, e.g., in the case of reactant sub-class (a), the use of aromatic compounds such as naphthalene, anthracene, phenanthrene, quinoline, isoquinoline, and terphenyl results either in the formation of unhandleable substances (tars etc) or in the formation of no product at all.

It is sometimes useful to effect the process of the present invention in the presence of a dehydrating agent (the term "dehydrating agent" as used here is not intended to embrace the fluoroalkane sulphonic acid, the presence of which is an essential requirement of the invention). This is particularly the case when employing reactant subclass (a) of the invention with conc. sulphuric acid as the sulphonating agent, since the aromatic polysulphone so formed tends to be of low molecular weight, having a reduced viscosity (RV) of <0.25. (Reduced viscosity (RV) as used herein normally refers to the measurement of viscosity at 25° C. on a solution of the polymer in dimethyl formamide containing 1 g of polymer in 100 cm$^3$ of solution. In rare cases, however, the aromatic polysulphone is insoluble in dimethyl formamide, and RV then refers to the measurement of viscosity at 25° C. on a solution of the polymer in trifluoromethane sulphonic acid containing 1 g of polymer in 100 cm$^{-3}$ of solution.) These low molecular weight aromatic polysulphones are of utility, e.g. as a component of aqueous coating dispersions containing tetrafluoroethylene polymers from which well-adhered continuous coatings on various substrates may be prepared—as described in British Pat. No. 1 527 851. However, generally speaking, aromatic polysulphones of reduced viscosity of at least 0.3, particularly at least 0.35, are more useful since these have a combination of physical properties (such as tensile strength, modulus and softening point) which make them particularly suitable as materials for mouldings, extrusions and films. It is found that the incorporation of an effective dehydrating agent into the reaction mixture which employs reactant subclass (a), e.g. when using conc. sulphuric acid as the sulphonating agent, results in the formation of an aromatic polysulphone having RV of at least 0.3, and particularly at least 0.35. It is not, however, always necessary to employ a dehydrating agent to ensure that the aromatic polysulphone produced is of high molecular weight; thus, e.g., where chlorosulphonic acid is used as the sulphonating agent in reactant sub-class (a) the aromatic polysulphone produced is often of RV at least 0.30 whether a dehydrating agent is employed or not.

The dehydrating agent (if used) should be one which does not cause the resulting aromatic polysulphone to undergo unacceptable degradation or cleavage or other deleterious side reactions and should preferably, in conjunction with the other reagents, result in the formation of an aromatic polysulphone of reduced viscosity at least 0.3. Whether or not a dehydrating agent is effective may in some circumstances depend on the amount which is used. A preferred dehydrating agent to employ is phosphorus pentoxide ($P_2O_5$).

Generally speaking, to effect the process of the invention using reactant sub-class (a) when using dehydrating agent it is convenient to dissolve the aromatic compound in fluoroalkane sulphonic acid and then to add the sulphonating agent (possibly dissolved in fluoroalkane sulphonic acid) and the dehydrating agent followed by a period of reaction at the selected reaction temperature(s). It may be helpful to add some of the dehydrating agent used during the course of the reaction.

It is, of course, also possible to employ a dehydrating agent when using reactant sub-classes (b) and (c) of the invention, particularly if an aromatic polysulphone of improved RV is obtained.

In the formulae (i), (ii) and (iii), representing aromatic substances used in the process of the invention, —Y— is preferably a direct link, —O—, or

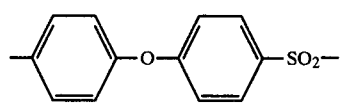

where —X— and —X'— which may be the same or different are each a direct link or —O—, and —Z— is —CO— or —SO$_2$—.

In reactant sub-class (a) of the invention, examples of the aromatic compound of formula (i) are as follows:

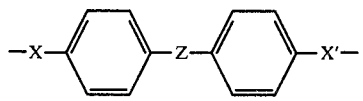

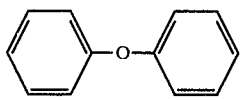

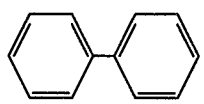

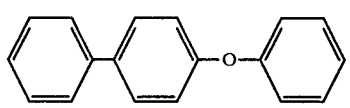

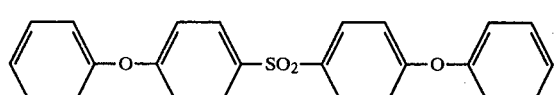

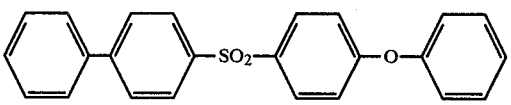

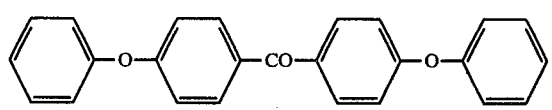

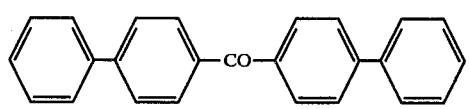

Of these, diphenyl ether and diphenyl are particularly preferred since the polymerisation of diphenyl ether according to the process of the invention can yield a polymer whose repeat units are the same as those of the currently commercially available aromatic polysulphone homopolymer having repeat units of formula

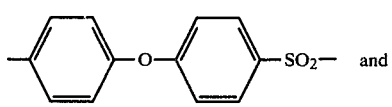

while the polymerisation of a mixture of diphenyl ether and diphenyl according to the invention can yield a copolymer having repeat units the same as those of the commercially available aromatic polysulphone copolymer having repeat units of formulae

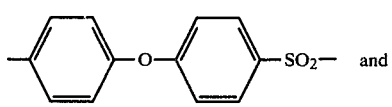

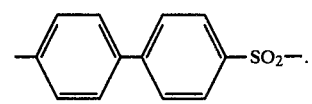

In reactant sub-class (b) of the invention, examples of the aromatic compound of formula (ii) are as follows:

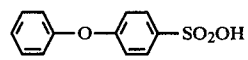

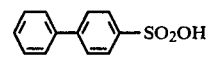

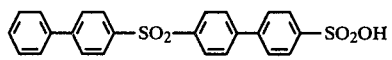

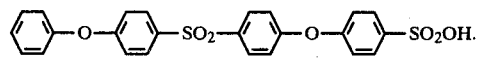

Of these diphenyl ether-4-sulphonic acid and dipheyl-4-sulphonic acid are particularly preferred since the polymerisation of the former can yield a polymer whose repeat units are the same as those of the commercially available aromatic polysulphone homopolymer mentioned above while the polymerisation of a mixture of the two can yield a copolymer having repeat units which are the same as those of the commercially available aromatic polysulphone copolymer mentioned above.

In reactant sub-class (c) of the invention, examples of the aromatic compound of formula (iii) are as follows

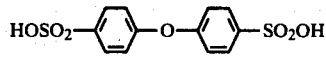

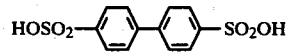

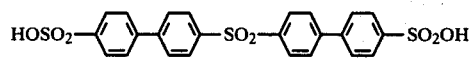

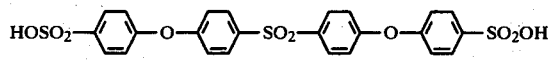

while examples of the aromatic compound of formula (i) are as follows

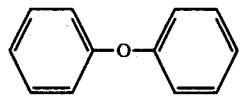

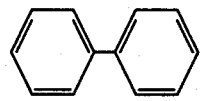

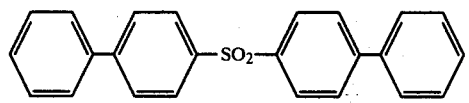

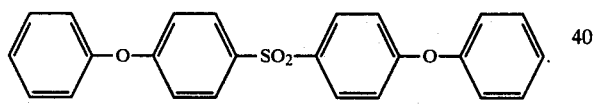

Of these, diphenyl ether-4,4'-disulphonic acid and diphenyl-4,4'-disulphonic acid are particularly preferred as examples of compounds of formula (iii) while diphenyl ether and diphenyl are particularly preferred as examples of compounds of formula (i). Thus the polymerisation of diphenyl ether-4,4'-disulphonic acid with diphenyl ether can yield a polymer having repeat units which are the same as those of the commercially available polysulphone homopolymer mentioned above while a polymerisation with these monomers which additionally includes diphenyl-4,4'-disulphonic acid and/or diphenyl can yield a copolymer having repeat units which are the same as those of the commercially available aromatic polysulphone copolymer mentioned above.

The conditions required for the polymerisation reaction to produce the aromatic polysulphone should be determined by experiment as they will often vary with the nature of the starting monomer (or monomers) used and with the desired properties (e.g. molecular weight) of the polymer being manufactured. Conveniently the pressure employed may be atmospheric pressure. A normal reaction temperature range is 40° to 200° C., particularly 50° to 150° C.

The present invention is now illustrated by the following Examples.

EXAMPLE 1

Diphenyl ether (17.0 g, 0.1 mole) was weighed into a 3-necked flask (capacity 250 ml) fitted with a motor-driven stirrer, internal thermometer, addition funnel and reflux condenser (protected with a drying tube), under a nitrogen blanket. 36 ml of triflouromethane sulphonic acid were added. A solution of analar 98% w/w sulphuric acid (10 g, approx. 0.1 mole) in 20 ml trifluoromethane sulphonic acid was added drop-wise from the addition funnel into the stirred solution contained in the flask (which was not cooled). The residue in the addition funnel was washed into the flask with a further 10 ml of trifluoromethane sulphonic acid. In all, 60 ml of trifluoromethane sulphonic acid (0.68 mole) were employed, the density of this material being 1.7.

The solution in the flask after the addition of the trifluoromethane sulphonic acid was yellow/orange in colour and had become warm. The reaction mixture was heated (using an oil bath) to 100° C. and maintained at this temperature for about 3.5 hours. The deep orange solution produced was allowed to cool and then poured into water whereupon a shining white polymeric solid precipitated out in what appeared to be substantially quantitative yield. This was washed with dilute NaOH, dilute HCl, water, methanol, and then ether and finally dried in a vacuum oven at 85° C.

The polymer thus produced had an nmr spectrum which showed it to be an aromatic polysulphone consisting predominantly of the repeat units having the formula

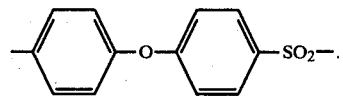

The RV (dimethyl formamide) of this polymer was 0.15.

EXAMPLE 2

The procedure of Example 1 was substantially followed except for the following variations. The amount of diphenyl ether used was 34.0 g (0.2 mole), the amount of analar 98% w/w $H_2SO_4$ used was 19.93 g (0.2 mole) and the total amount of trifluoromethane sulphonic acid used was again 60 ml (0.68 mole). Before the addition of the sulphuric acid, the contents of the flask (diphenyl ether dissolved in 20 ml of trifluoromethane sulphonic acid) were cooled to 3° C. and during the addition of the sulphuric acid (dissolved in 20 ml trifluoromethane sulphonic acid) and the washing through with further trifluoromethane sulphonic acid (20 ml) the temperature of the flask contents was kept within the range 3–8° C. During the addition, the solution in the flask retained a dark amber colour.

The reaction mixture was heated at about 100° C. for approximately 10 hours. The deep red solution was worked up to yield a white polymer.

The polymer was again found (by nmr spectroscopy) to consist predominantly of the repeat units of formula

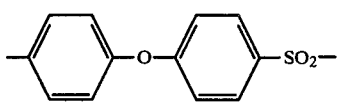

The RV (dimethyl formamide) of this polymer was 0.19.

EXAMPLE 3

The same equipment as in Example 1 was employed. Diphenyl ether (17.0 g, 0.1 mole) was weighed into the flask. 88 ml of trifluoromethane sulphonic acid were added and the flask placed in an ice bath to cool the mixture contained therein to 3° C. A solution of analar 98% w/w sulphuric acid (9.98 g, 0.1 mole) in 44 ml trifluoromethane sulphonic acid was added dropwise from the additional funnel into the stirred solution contained in the flask. At the end of the addition (after about 40 minutes) the temperature of the liquid in the flask had risen to 4° C. The ice bath was removed and the temperature of the liquid allowed to rise to 18.5° C. (over 25 minutes). The addition funnel was removed and 5.0 g $P_2O_5$ powder added (using a powder dispenser) through the free neck of the flask. The mixture was stirred without the application of heat for about 20 minutes when most of the $P_2O_5$ dissolved and the solution became cherry red. The stirred mixture was heated (using an oil bath) to 100° C. and maintained substantially at this temperature for over 21 hours. After about 3.7 hours a further 4.8 g of $P_2O_5$ were added, making a total of 9.8 g added altogether (0.069 mole). Samples (of about 3-5 ml) were periodically removed with a clean syringe each solution being injected into 200 ml demineralised water to yield a white lace-like precipitate which was filtered off. Unless otherwise specified, each precipitate was washed twice with water, and then once with methanol (filtering in between washes), and finally dried at 90° C. in a vacuum oven. Nmr spectroscopy showed them to be an aromatic polysulphone consisting predominantly of the repeat units having the formula:

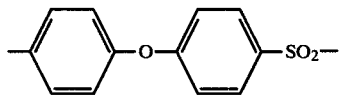

with only about 2% of ortho-sulphonylation being present.

The results of the sampling were as follows:
3A (after 2 hours at 100° C.)—RV of polymer 0.30.
3B (after 3.5 hours at 100° C.)—RV of polymer 0.44.
3C (after 5 hours at 100° C.)—RV of polymer 0.54. The polymer was compression moulded (320° C.) into dark tough film.
3D (after 21 hours at 100° C.)—Polymer after precipitation divided into two approximately equal portions:
 portion a—worked up as per other samples to give polymer of RV 0.81; this was compression moulded (320° C.) into dark tough film.
 portion b—steeped for 2 hours in gently boiling alcoholic dilute NaOH solution; filtered off and washed with distilled water, then methanol and dried at 100° C. in a vacuum oven to give polymer of RV 0.82; this was compression moulded into tough yellow film.
(All RVs measured in dimethyl formamide.)

EXAMPLE 4

The same equipment as in Example 1 was employed. Diphenyl ether (34.0 g, 0.2 mole) was weighed into the flask and 176 ml of trifluoromethane sulphonic acid added. After cooling to 2.5° C. (using the ice bath), a solution of analar 98% w/w sulphuric acid (19.96 g, 0.2 mole) in 88 ml trifluoromethane sulphonic acid was added dropwise into the stirred solution in the flask over 1.25 hours. The ice bath was removed and 9.5 g $P_2O_5$ powder added to the solution. The mixture was stirred without the application of heat for 45 minutes when all the $P_2O_5$ dissolved, the solution being cherry red. The stirred mixture was heated to 100° C. and maintained substantially at this temperature for 25 hours. After about 5.0 hours a further 2.3 g of $P_2O_5$ were added, making a total of 11.8 g added altogether (0.083 mole). Sampling and sample work-up was effected as per Example 3 (unless indicated otherwise) apart from the samples being bigger (as indicated), all the polymers having the repeat units of formula as indicated in Example 3 with a predominantly all para structure.

The results of sampling were as follows:
4A (after 1 hour at 100° C.)—The sample size was 10 ml. RV of the polymer was 0.25.
4B (after 2 hours at 100° C.)—The sample size was 10 ml. RV of the polymer was 0.31.
4C (after 3 hours at 100° C.)—The sample size was 10 ml. RV of the polymer was 0.35.
4D (after 4 hours at 100° C.)—The sample size was 10 ml. RV of the polymer was 0.37.
4E (after 5 hours at 100° C.)—The sample size was 60 ml. RV of the polymer was 0.40; some of this was compression moulded (330° C.) to give dark tough film.
4F (after 19 hours at 100° C.)—The sample size was 20 ml. RV of the polymer was 0.45.
4G (after 23 hours at 100° C.)—The sample size was 50 ml. The polymer after precipitation washed twice with water, twice with methanol and dried at 80° C. in a vacuum oven to give polymer of RV 0.48; some of this was compression moulded (320° C.) into dark tough film.
4H (after 25 hours at 100° C.)—The remainder of the reaction mixture yielded polymer of RV 0.55; some of this (after further treatment by stirring in methanol/NaOH at 70° C. for 2 hours) was compression moulded (360° C.) into pale yellow tough film.
(All RVs measured in dimethyl formamide.)

EXAMPLE 5

Diphenyl ether (17.0 g, 0.1 mole) was weighed into a flask (capacity 150 ml) equipped with a magneticially-driven stirrer bar, and an addition funnel (connectable with a drying tube). The flask was placed in a bath of liquid paraffin on a magnetic-stirrer hot plate and charged with 20 ml trifluoromethane sulphonic acid. To the resulting stirred solution was added (at ambient temperature) over 30 minutes a solution of chlorosulphonic acid (11.7, 0.1 mole) in 40 ml trifluoromethane sulphonic acid. HCl gas was evolved (as observed in a Drechsel bottle). When HCl evolution had ceased (5 minutes after finishing the feed of sulphonic acids), the reaction mixture was heated to 80° C. and stirred at this temperature for 48 hours. The resulting viscous solution was poured slowly into 250 ml cold water when a white polymeric lace precipitated. This was washed, macerated into a white powder and oven dried.

The yield of polymer collected was 22 g (NB in this and subsequent Examples, no attempt was made to collect all the polymeric product in a quantitative manner); its nmr spectrum showed it to be an aromatic polysulphone consisting predominantly of the repeat units having the formula

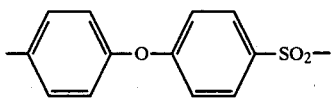

with about 2% of ortho-sulphonylation being present.

The RV (dimethyl formamide) of the polymer was 0.40. Some of the polymer was compression moulded (330° C.) into dark tough film. 12 g of the polymer was stirred in methanol (containing a little dilute aqueous NaOH solution) at reflux temperature; the treated polymer was dried for 24 hours at 150° C. under vacuum. A sample of the treated polymer (which had RV of 0.39) was compression moulded (340° C.) into pale yellow tough film.

EXAMPLE 6

The preceding Examples indicate that the reaction according to the invention of diphenyl ether and conc. sulphuric acid in the presence of trifluoromethane sulphonic acid yields predominantly the all para product having repeat units of formula

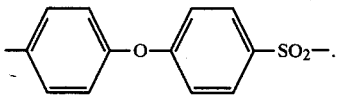

In this Example, the percentage of ortho-sulphonylation in this product, when formed starting from diphenyl ether-4-sulphonic acid, as a function of reaction temperature was determined. The experimental procedure was as follows.

A 10 weight % solution of diphenyl ether-4-sulphonic acid in trifluoromethane sulphonic acid was made up in a small sample tube and portions transferred to nmr tubes which were then stored at the temperatures being studied. (The diphenyl ether-4-sulphonic acid itself was prepared by hydrolysing the corresponding sulphonyl chloride by refluxing in acetone—just sufficient acetone being used to dissolve the sulphonyl chloride. After several hours the solution was evaporated to dryness and the acid dried in a vacuum oven at 80° C.)

The products in the nmr tubes were examined by nmr spectroscopy, and the percentage of ortho-sulphonylation determined. The results are shown in the following table (the values given being those obtained when the % ortho-sulphonylation did not change on further storage at the selected temperature).

| Reaction Temperature (°C.) | % Ortho-Sulphonylation |
|---|---|
| 0 | <4 |
| 20 | 4 |
| 50 | 3.3 |
| 80 | 2.0 |
| 120 | 1.1 |

It is seen that higher reaction temperatures favour the formation of the desirable all para product.

EXAMPLE 7

The same equipment as used in Example 5 was employed. Diphenyl ether (17.0 g, 0.1 mole) was charged to the flask followed by 20 ml of difluoromethane sulphonic acid. (Difluoromethane sulphonic acid, which is not a currently commercially available material, may be prepared by reacting chlorodifluoromethane and aqueous sodium sulphite heptahydrate to form sodium difluoromethane sulphonate, heating this sodium salt with conc. sulphonic acid and distilling off the free difluoromethane sulphonic acid under reduced pressure.) To the resulting stirred solution was added (at ambient temperature) over 20 minutes a solution of chlorosulphonic acid (11.7 g, 0.1 mole) in 36 ml difluoromethane sulphonic acid. HCl was evolved as in Example 5. After the cessation of HCl evolution, the mixture was heated to 80° C. and stirred at this temperature for 48 hours. The resulting viscous solution was poured slowly into water contained in a macerator and the resulting white polymeric precipate macerated, washed and dried in a vacuum oven at 80° C.

The yield of polymer collected was 22 g. Its nmr spectrum showed it to consist predominantly of the repeat units having the formula

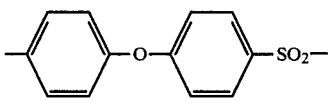

with about 2% of ortho-sulphonylation being present.

The RV (dimethyl formamide) of the polymer was 0.22.

EXAMPLE 8

The same equipment as used in Example 5 was employed. Diphenyl (15.42 g, 0.1 mole) was charged to the flask and heated to 70° C. (with stirring) when it melted. To the stirred melt (held at 70°–75° C.) was added over 20 minutes a solution of chlorosulphonic acid (11.7 g, 0.1 mole) in 60 ml trifluoromethane sulphonic acid. At the start of the feed, the contents of the flask became a brown mobile slurry. When 25% of the feed had been added, the contents had become a dark red solution. HCl evolution commenced immediately on starting the feed and ceased about two minutes after its completion. The reaction mixture was stirred at 70° C. for 68 hours. The resulting very viscous solution was poured slowly into 400 ml water contained in a domestic-type macerator to form an extremely tough pale-coloured lace. Attempts to macerate the lace encountered difficulty because the lace was so tough that it caused the macerator to stop. The lace was transferred to a commercial-type macerator and macerated into granules. The resulting product was dried in a vacuum oven at 136° C. (some of the product first having been treated with methanol/aqueous NaOH as in Example 5).

The yield of polymer collected was 17.5 g. Its nmr spectrum showed it to be an aromatic polysulphone consisting predominantly of the repeat units of formula

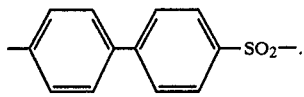

The polymer was found to be insoluble in dimethyl formamide. However, its RV was measured as a solution in trifluoromethane sulphonic acid (1% w/v at 25° C.) and found to be 1.31. (This solution was sealed overnight and the measurement of RV repeated; it was found that the RV had risen to 3.8.)

EXAMPLE 9

Apart from the time and temperature of reaction, substantially the same procedure as used in Example 8 was employed (the reactants being the same), with the feed of chlorosulphonic acid plus trifluoromethane sulphonic acid being added to the stirred melt of diphenyl over 10 minutes at (72°–65° C.). HCl evolution was again observed. In this Example, however, the reaction mixture was stirred at 53° C. for 25 hours in order to achieve a product of lower molecular weight. The resulting viscous solution was again precipitated in water contained in a domestic-type macerator; this time, however, maceration therein yielded a fine pale-coloured powder which was filtered, washed with water (to remove acid), filtered again and finally dried over the weekend.

The yield of polymer collected was 19.7 g. Its nmr spectrum showed it to be an aromatic polysulphone consisting predominantly of the repeat units of formula

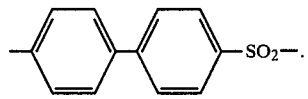

The polymer was again found to be insoluble in dimethyl formamide and its RV was measured as a solution in trifluoromethane sulphonic acid (1% w/v at 25° C.); this was found to be 0.16. (When remeasured after keeping the sealed solution overnight, the RV had risen to 0.58.)

EXAMPLE 10

A similar procedure to that used in Example 8 was employed, the main difference being that a mixture of diphenyl ether and diphenyl were used in place of the diphenyl. Thus a mixture of diphenyl ether (8.95g, 0.053 mole) and diphenyl (8.12 g, 0.053 mole) was charged to the flask (with stirring) followed by 20 ml of trifluoromethane sulphonic acid; a green slurry was formed which was heated to 60° C. with stirring to form a dark red solution. A mixture of chlorosulphonic acid (12.32 g, 0.106 mole) and 43 ml trifluoromethane sulphonic acid was added dropwise over 10 minutes. Gas evolution started immediately with the feed and virtually ceased within minutes of its completion. The mixture was stirred for 43 hours at 70° C. and the resulting viscous solution poured slowly into 400 ml of water contained in a macerator; the ensuing precipitate was macerated thoroughly. The precipitate was nearly white in colour and consisted of feathery granules. The product was filtered, washed, treated with boiling water and finally (after again filtering) dried under vacuum at 136° C.

The yield of product collected was 21 g; it was found to dissolve cleanly and easily in dimethyl formamide. Its nmr spectrum showed it to be an aromatic polysulphone copolymer consisting predominantly of the repeat units of formulae

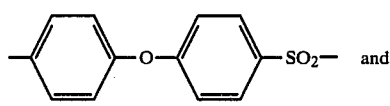

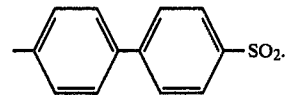

The RV (dimethyl formamide) of the copolymer was 0.38.

EXAMPLE 11

The equipment of Example 1 was employed. 4,4'-diphenoxy-benzophenone (18.3 g, 0.05 mole) was weighed into the flask and 80 ml trifluoromethane sulphonic acid added with stirring. The stirred, deeply coloured, solution was cooled to −2° C. and then a solution of 98% w/w sulphuric acid (5.0 g, 0.05 mole) in 20 ml trifluoromethane sulphonic acid added dropwise over 50 minutes. The stirred reaction mixture was heated with stirring in the range 87°–105° C. over 23 hours, 3.2 g of $P_2O_5$ being added after 21 hours. The resulting solution was poured into water to yield a white polymeric precipitate; this was washed and then dried in a vacuum oven.

The yield of polymeric collected was 15 g. Its nmr spectrum showed it to be an aromatic polysulphone consisting predominantly of repeat units having the formula

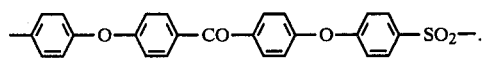

The RV (dimethyl formamide) of the polymer was 0.38. X-ray analysis showed it to be amorphous. Its glass-transition temperature (Tg), as determined by Differential Scanning Calorimetry, was found to be 182° C.

EXAMPLE 12

The equipment of Example 5 was employed. 4,4'-diphenoxy-diphenylsulphone (40.2 g, 0.1 mole) was charged to the flask and heated to 80° C. 20 ml of trifluoromethane sulphonic acid were added and the mixture stirred to form a red-orange solution. A mixture of chlorosulphonic acid (11.7 g, 0.1 mole) and 40 ml trifluoromethane sulphonic acid was added dropwise to the stirred solution. A steady evolution of gas was observed. The mixture was maintained at 80° C. for 40 hours. The viscous solution was poured into water contained in a macerator (as per previous examples) to isolate the polymer, which was washed and then dried at 110° C. in a vacuum oven.

The yield of product collected (which had a buff colour) was 40.8 g. Its nmr spectrum showed it to be an aromatic polysulphone consisting predominantly of repeat units of formula

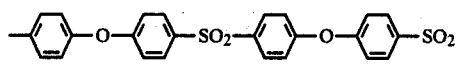

or more simply

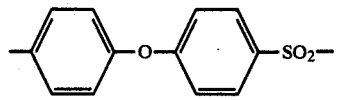

The RV (dimethyl formamide) of the polymer was 0.16.

EXAMPLE 13

The procedure of Example 12 was essentially repeated (same reactants and conditions) except that the reaction mixture was heated at 80° C. for 65 hours instead of 40 hours.

The product was again an aromatic polysulphone consisting predominantly of repeat units of formula

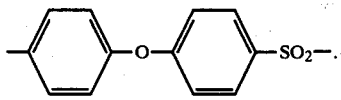

The RV (dimethyl formamide) of the polymer was 0.34.

EXAMPLE 14

The equipment of Example 5 was employed. Diphenyl ether (8.5 g, 0.05 mole) was charged to the flask and 40 ml trifluoromethane sulphonic acid added, with stirring, at room temperature. The disodium salt of diphenyl ether-4,4'-disulphonic acid (18.7 g, 0.05 mole) and $P_2O_5$ (4.73 g) were weighed into an addition funnel and added gradually to the stirred solution in the flask. [The disodium salt of diphenyl ether-4,4'-disulphonic acid was prepared as follows. To diphenyl ether (68 g, 0.4 mole) was added dropwise with stirring conc. sulphuric acid (72 ml, 1.35 mole). The temperature rose slowly and the acid addition was adjusted to maintain a temperature of 50°-60° C. The resulting viscous mixture was heated for 2 hours using a steam bath (attaining a temperature of about 85° C.). After cooling, the mixture was poured into 300 ml of stirred demineralised water. To this was added 30 g of sodium hydroxide in 100 ml demineralised water; no precipate resulted so a further 48 g of sodium hydroxide in 150 ml demineralised water were added. A precipitate slowly appeared and the mixture was allowed to stand overnight. The resulting white precipitate was filtered off and oven dried at 80° C. under vacuum. The yield of disodium salt collected was 128.1 g.] The resulting cherry-red mixture was heated to 80° C. with stirring. The solution so formed was heated (with stirring) at 80° C. for 18 hours and then at 90°-100° C. for a further 6 hours. The resulting clear cherry-red viscous solution was poured into water contained in a macerator to isolate the polymer (as per previous Examples). An off-white polymeric granular solid was obtained which was filtered off, washed with water, and dried in a vacuum oven overnight at 80° C.

The yield of polymer collected was 21.2 g. Its nmr spectrum showed it to consist predominantly of repeat units of formula

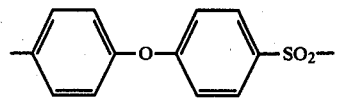

with about 3.6% of ortho-sulphonylation being present. The RV (dimethyl formamide) of the polymer was 0.14.

I claim:

1. A process for the production of an aromatic polysulphone which comprises reacting under substantially anhydrous conditions in the presence of a fluoroalkane sulphonic acid the reactants selected from the following class:

(a) at least one aromatic compound of formula

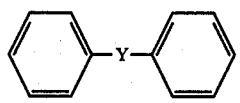

(i)

wherein —Y— is a direct link, —O—,

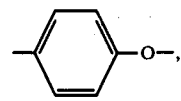

—$CF_2$—, —$CR_1R_2$— where $R_1$ and $R_2$ which may be the same or different are fully fluorinated alkyl radicals, or

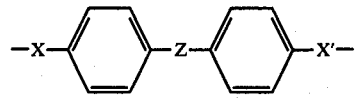

where —X— and —X'— which may be the same or different are each a direct link, —O—, —$CF_2$—, or —$CR_1R_2$— where $R_1$ and $R_2$ are defined above, and —Z— is —CO—, —$SO_2$—, —$CF_2$—, or —$CR_1R_2$— where $R_1$ and $R_2$ are as defined above; or a nuclear-substituted derivative thereof in which any nuclear substituent does not deleteriously affect the polymerisation reaction or the properties of the polysulphone so produced and provided that the nuclear hydrogen atoms para to —Y— remain unsubstituted;

and a sulphonating agent;

(b) at least one aryl monosulphonic acid of formula

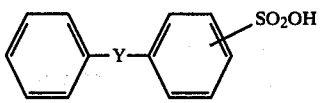

(ii)

wherein —Y— is as defined in (a); or a nuclear-substituted derivative thereof in which any nuclear substituent does not deleteriously affect the polymerisation reaction or the properties of the polysulphone so produced and provided that in the benzene ring linked to —Y— not having the sulphonic acid group at least the nuclear hydrogen atom para to —Y— remains unsubstituted;

(c) at least one aryl disulphonic acid of formula

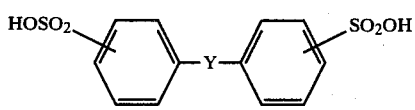

(iii)

wherein —Y— is as defined in (a); or a nuclear-substituted derivative thereof in which any nuclear substituent does not deleteriously affect the polymerisation reaction or the properties of the polysulphone so produced;

and at least one aromatic compound as defined in (a).

2. A process according to claim 1 wherein the fluoroalkane sulphonic acid used is trifluoromethane sulphonic acid.

3. A process according to claim 1 wherein the fluoroalkane sulphonic acid used is difluoromethane sulphonic acid.

4. A process according to claim 1 wherein in (a) substantially equimolar quantities of the at least one aromatic compound and sulphonating agent are employed.

5. A process according to claim 1 wherein in (a) the sulphonating agent used is sulphuric acid or chlorosulphonic acid.

6. A process according to claim 1 wherein in (c) substantially equimolar quantities of the at least one aryl disulphonic acid and the at least one aromatic compound are employed.

7. A process according to claim 1 wherein the amount and nature of fluoroalkane sulphonic acid used is such that the fluoroalkane sulphonic acid acts as a reaction solvent.

8. A process according to claim 1 wherein the reaction is carried out to yield an aromatic polysulphone in which the sulphonylated benzene rings that are formed are predominantly para-sulphonylated with respect to —Y—.

9. A process according to claim 1 wherein the reaction is carried out in the presence of a dehydrating agent.

10. A process according to claim 9 wherein the dehydrating agent is phosphorus pentoxide.

11. A process according to claim 1 wherein the reaction yields an aromatic polysulphone of RV at least 0.3.

12. A process according to claim 1 wherein in (b) formula (ii) has the form

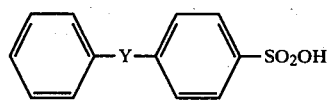

and in (c) formula (iii) has the form

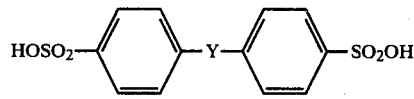

13. A process according to claim 1 wherein in the formulae (i), (ii) and (iii), —Y— is a direct link, —O—, or

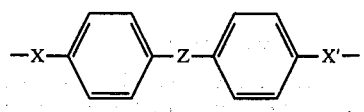

where —X— and —X'— which may be the same or different are each a direct link or —O—, and —Z— is —CO—, or —SO$_2$—.

14. A process according to claim 13 wherein in (a), the at least one aromatic compound used is selected from diphenyl ether and diphenyl.

15. A process according to claim 13 wherein in (a), the at least one aromatic compound used is selected from

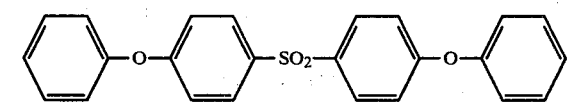

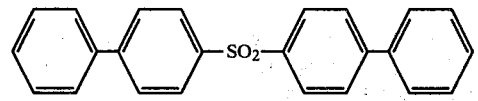

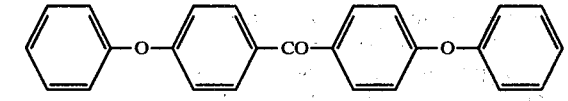

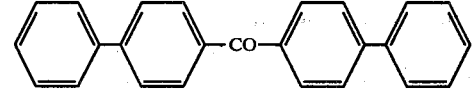

16. A process according to claim 13 wherein in (b), the at least one aryl monosulphonic acid is selected from diphenyl ether-4-sulphonic acid and diphenyl-4-sulphonic acid.

17. A process according to claim 13 wherein in (c), the at least one aryl disulphonic acid is selected from diphenyl ether-4,4'-disulphonic acid and diphenyl-4,4'-disulphonic acid and the at least one aromatic compound is selected from diphenyl ether and diphenyl.

* * * * *